United States Patent
Martin et al.

(10) Patent No.: US 10,085,278 B2
(45) Date of Patent: Sep. 25, 2018

(54) MOBILE COMMUNICATIONS NETWORK, COMMUNICATIONS DEVICE AND METHODS

(71) Applicant: SONY CORPORATION, Tokyo (JP)

(72) Inventors: Brian Alexander Martin, Basingstoke (GB); Matthew William Webb, Basingstoke (GB)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 15/112,120

(22) PCT Filed: Dec. 16, 2014

(86) PCT No.: PCT/EP2014/078087
§ 371 (c)(1),
(2) Date: Jul. 15, 2016

(87) PCT Pub. No.: WO2015/110228
PCT Pub. Date: Jul. 30, 2015

(65) Prior Publication Data
US 2016/0338091 A1    Nov. 17, 2016

(30) Foreign Application Priority Data
Jan. 23, 2014    (EP) ..................... 14152355

(51) Int. Cl.
*H04W 4/00*      (2018.01)
*H04W 72/12*     (2009.01)
(Continued)

(52) U.S. Cl.
CPC ......... *H04W 72/1273* (2013.01); *H04L 5/001* (2013.01); *H04L 5/003* (2013.01);
(Continued)

(58) Field of Classification Search
None
See application file for complete search history.

(56) References Cited

U.S. PATENT DOCUMENTS

2014/0036821 A1   2/2014  McNamara et al.
2014/0307697 A1  10/2014  Beale
(Continued)

FOREIGN PATENT DOCUMENTS

GB    2487757 A    8/2012
GB    2487780 A    8/2012
(Continued)

OTHER PUBLICATIONS

3GPP TS 23.401 V10.0.0 (Jun. 2010), 3rd Generation Partnership Project; Technical Specification Group Services and System Aspects; General Packet Radio Service (GPRS) enhancements for Evolved Universal Terrestrial Radio Access Network (E-UTRAN) acess (Release 10).*

(Continued)

*Primary Examiner* — Jutai Kao
(74) *Attorney, Agent, or Firm* — Xsensus, LLP

(57) ABSTRACT

A communications device is configured to receive data from a wireless access interface transmitted by a mobile communications network. The wireless access interface provides a plurality of communications resource elements within a system bandwidth providing a host frequency range of a host carrier and reserved communications resources for preferable allocation to reduced capability devices, the reserved communications resources forming a virtual carrier. In each of a plurality of time divided units, the wireless access interface provides a shared channel of communications resources and a control channel formed within the communications resources of the system bandwidth of the host frequency range for communicating resource allocation (Continued)

Original Virtual Carrier VC concept messages to communications devices. The resource allocation messages allocate the communications resources of the shared channel to the communication devices within the system bandwidth and allocate the reserved communications resources to the reduced capability devices. The reserved communications resources include one or more communications resources which are not allocated for transmitting data to the reduced capability devices. A reduced capability device receives a resource allocation message from the control channel, allocating resources within the reserved communications resources of the virtual carrier for receiving data, determines the communications resources of the reserved communications resources which will contain signals representing the data from the communications resources allocated within the reserved communications resources by the received resource allocation message and excluding any of the one or more communications resources which are not allocated for transmitting data and receives the data from the determined communications resources of the reserved communications resources of the virtual carrier.

22 Claims, 7 Drawing Sheets

(51) Int. Cl.
    *H04W 4/70*     (2018.01)
    *H04W 72/04*     (2009.01)
    *H04L 5/00*     (2006.01)
    *H04L 27/26*     (2006.01)

(52) U.S. Cl.
    CPC .......... *H04L 27/2601* (2013.01); *H04W 4/70* (2018.02); *H04W 72/048* (2013.01)

(56) References Cited

U.S. PATENT DOCUMENTS

2014/0307698 A1   10/2014   Beale
2015/0237459 A1   8/2015   Webb et al.

FOREIGN PATENT DOCUMENTS

| GB | 2487782 A | * | 8/2012 | ........... H04L 5/0007 |
|---|---|---|---|---|
| GB | 2487906 A | | 8/2012 | |
| GB | 2487907 A | | 8/2012 | |
| GB | 2487908 A | | 8/2012 | |
| GB | 2487909 A | | 8/2012 | |
| GB | 2488513 A | | 9/2012 | |
| GB | 2493703 A | | 2/2013 | |
| GB | 2497743 A | | 6/2013 | |
| WO | 2014/087145 A1 | | 6/2014 | |

OTHER PUBLICATIONS

3GPP TS 23.401 V8.0.0 (Dec. 2007), 3rd Generation Partnership Project; Technical Specification Group Services and System Aspects; General Packet Radio Service (GPRS) enhancements for Evolved Universal Terrestrial Radio Access Network (E-UTRAN) acess (Release 8).*

International Search Report dated Mar. 23, 2015, in PCT/EP2014/078087 Filed Dec. 16, 2014.

ETSI TS 122 368 V10.5.0, Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10), Jul. 2011 (18 Pages).

3GPP TS 36.211 V11.5.0, $3^{rd}$ Generation Partnership Project; Technical Specification Group Radio Access Network; Evolved Universal Terrestrial Radio Access (E-UTRA); Physical channels and modulation (Release 11), Dec. 2013 (120 Pages).

3GPP TS 36.212 V12.0.0, $3^{rd}$ Generation Partnership Project; Technical Specification Group Radio Access Network; Evolved Universal Terrestrial Radio Access (E-UTRA); Multiplexing and channel coding (Release 12), Dec. 2013 (88 pages).

3GPP Draft; R1-114267, "Review of approaches for bandwidth reduction for low complexity MTC LTE UEs," IPWIRELESS Inc, Nov. 2011, XP050562333 (5 Pages).

* cited by examiner

T-Shape Allocation

Original Virtual Carrier VC concept

MOBILE COMMUNICATIONS NETWORK, COMMUNICATIONS DEVICE AND METHODS

CROSS-REFERENCE TO RELATED APPLICATIONS

The present application claims priority to European Patent Application No. 14 152 355.5, filed in the European Patent Office on Jan. 23, 2014, the entire contents of which are hereby incorporated by reference herein in entirety.

TECHNICAL FIELD OF THE DISCLOSURE

The present disclosure relates to mobile communications networks and methods for communicating data using mobile communications networks, infrastructure equipment for mobile communications networks, communications devices for receiving data via mobile communications networks and methods of communicating via mobile communications networks.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices which are continuously or intermittently transmitting data such as for example measurements or readings from monitors via a communications network to a server, and automotive applications in which measurement data is gathered from sensors on a vehicle and transmitted via a mobile communications network to a server attached to the network.

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation communications device such as a smartphone, an MTC-type terminal is preferably relatively simple and inexpensive, having a reduced capability. In addition MTC-devices are often deployed in situations that do not afford easy access for direct maintenance or replacement, so that reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, there is a desire to optimise the use of the available bandwidth in a telecommunications system supporting such devices. Accordingly it has been proposed to provide a so called "virtual carrier" within the host carrier bandwidth of an LTE network, which provides communications resources for preferable allocation to reduced capability devices such as MTC-type devices, which are referred to interchangeably in the following description as VC-UEs. A virtual carrier is therefore tailored to low or reduced capability terminals such as MTC devices and is thus provided within the transmission resources of at least the conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier, for at least some part of a sub-frame. Accordingly, data transmitted on the virtual carrier can be received and decoded using a reduced complexity receiver unit.

The term "virtual carrier" corresponds in essence to a narrowband carrier for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

In order to deploy a virtual carrier for access by reduced capability devices such as MTC devices some adaptation of a wireless access interface provided by a mobile communications network may be required. However, there may different types of reduced capability devices and as a result a deployment of a mobile communications network which is configured to support one type of reduced capability device may not be compatible with another form of reduced capability device.

SUMMARY OF THE DISCLOSURE

According to a first aspect there is provided a communications device for transmitting data to or receiving data from a mobile communications network. The mobile communications network includes infrastructure equipment providing a wireless access interface for the communications device.

The communications device comprising a transmitter adapted to transmit signals to the mobile communications network via the wireless access interface, a receiver adapted to receive signals representing the data from the mobile communications network via the wireless access interface, and a controller for controlling the transmitter and the receiver to transmit and to receive the signals in accordance with the wireless access interface. The wireless access interface provides a plurality of communications resources within a system bandwidth providing a host frequency range of a host carrier and reserved communications resources for preferable allocation to reduced capability devices forming a virtual carrier, and in each of a plurality of time divided units, a shared channel of the communications resources and a control channel formed within the communications resources of the system bandwidth of the host frequency range for communicating resource allocation messages to communications devices. The resource allocation messages allocate the communications resources of the shared channel to the communication devices within the system bandwidth and allocate the communications resources of the reserved frequency range to the reduced capability devices. The reserved communications resources include one or more communications resources which are not allocated for transmitting data to the reduced capability devices. The controller is configured with the receiver to receive a resource allocation message from the control channel of the communications resources of the system bandwidth, allocating resources within the reserved communications resources of the virtual carrier for receiving data. The controller is configured to determine the communications resources of the reserved communications resources which will contain signals representing the data from the communications resources allocated within the reserved communications resources by the received resource allocation message and excluding any of the one or more communications resources which are not allocated for transmitting data to the reduced capability devices within the allocated communications resources. The controller is configured to control the receiver to receive the data from the determined communications resources of the reserved communications resources of the virtual carrier.

In one example the communications the communications device is a reduced capability device of a first type, which can receive the resource allocation messages from within the control channel, being a first control channel, within the system bandwidth of the host frequency range. The one or more communications resources which cannot be allocated for transmitting data to the reduced capability devices of the first type are used to provide a second control channel within the reserved bandwidth of the virtual carrier for transmitting resource allocation messages to reduced capability devices of a second type which can only receive signals from within the reserved frequency range of the virtual carrier.

In the following description conventional communications devices will be referred to as User Equipment (UE's) which is a term which can be used interchangeably with communications device, and reduce capability devices will be referred to as a Virtual Carrier-User Equipment (VC-UE). Accordingly, the context and differentiation between these types of devices should be clarified although this is by way of example and should not be taken to be limiting.

Embodiments of the present technique can provide an arrangement in which two types of reduced capability or VC-UEs co-exist and operate to transmit or receive data to or from a mobile communications network. The different types of VC-UE are differentiated in accordance with a relative bandwidth of the radio frequency of the transmitter and receiver. According to the virtual carrier technique, the VC-UE of both types may have a reduced capability base band transmitter or receiver. However a first type of VC-UE has a radio frequency part of the transmitter or receiver which can receive or transmit signals across the full host or system carrier bandwidth, whereas a second type of VC-UE has a radio frequency part of the transmitter or receiver which can only receive or transmit signals across a reduced bandwidth corresponding to the bandwidth of the virtual carrier.

As will be explained shortly, a mobile communications network can provide an indication to a VC-UE of a first type, which may operate in accordance with a first category which defines a first capability set and which may be defined in one release (e.g. release-12) of the LTE standard, that a portion of the shared channel in a virtual carrier which the VC-UE of the first type would normally assume to contain an allocation of the shared communications resources includes one or more communications resources which do not convey signals representing data for the VC-UE. In one example the one or more communications resources which do not contain data are arranged to provide a second control channel within the virtual carrier for communicating resource allocation messages to VC-UEs of a second type which can only receive signals transmitted within the bandwidth of the virtual carrier. The VC-UE of the second type are configured to operate in accordance with a second category which defines a second capability set and which may be defined in the same or a later LTE standard such as release-13. As a result, a UE supporting the first (e.g. Release-12) category can assume that its PDSCH is rate-matched around the indicated reserved region, because the resource elements are re-interpreted as resources not used by this UE. This can then be configured, when UEs supporting the second (e.g. Release-13) category, to be used for a virtual carrier control channel (VC-PDCCH) with a reduced likelihood of affecting the decoding by UE supporting the Release-12 category of transmission on the shared channel such as the PDSCH and hence providing a backwards compatible upgrade path. Accordingly, a T-shaped allocation can be used for UEs supporting the first (e.g. Release-12) category (control information comes from host control region) and full virtual carrier can be used for UEs supporting the second (e.g. Release-13) category (control information in virtual control region) using the same resource space/narrowband region in the host carrier. In other words, both T-shape and full virtual carrier co-exist in the same resources in the host carrier. UEs of different capability share the same shared channel resources, scheduled by different control regions.

Various further aspects and features of the present disclosure are defined in the appended claims and include a communications device, a method of receiving data using a communications device, a mobile communications network, an infrastructure equipment and a method of transmitting data from a mobile communications network.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Example of an LTE System

Figure 1:
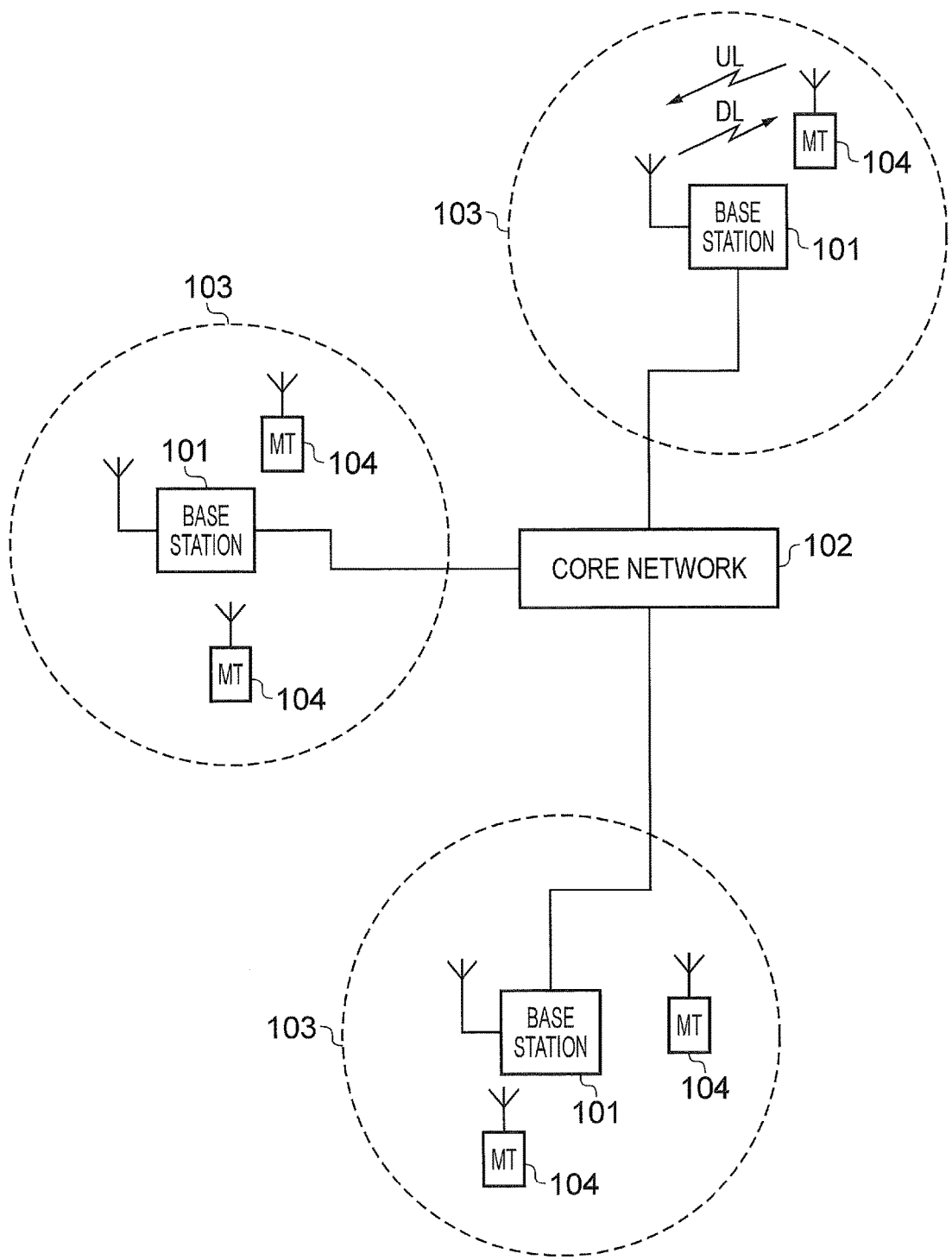
FIG. 1 provides a schematic diagram illustrating an example of a conventional mobile telecommunication network.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from communications devices (also referred to as mobile terminals, MT or User equipment, UE) 104. Data is transmitted from base stations 101 to communications devices 104 within their respective coverage areas 103 via a radio downlink Data is transmitted from communications devices 104 to the base stations 101 via a radio uplink. The core network 102 routes data to and from the communications devices 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
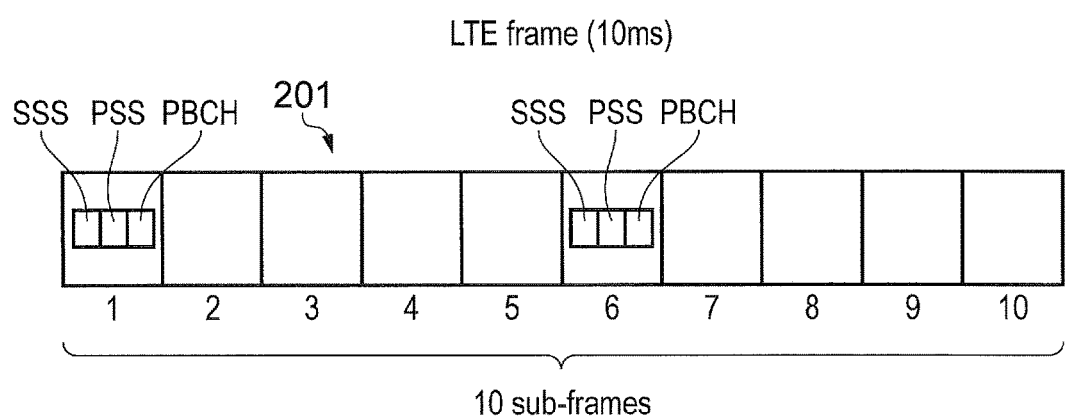
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE radio frame, in frequency division duplex (FDD). A physical broadcast channel (PBCH) is transmitted in the first sub-frame of the LTE radio frame. The PSS, SSS and PBCH are discussed in more detail below.

Figure 3:
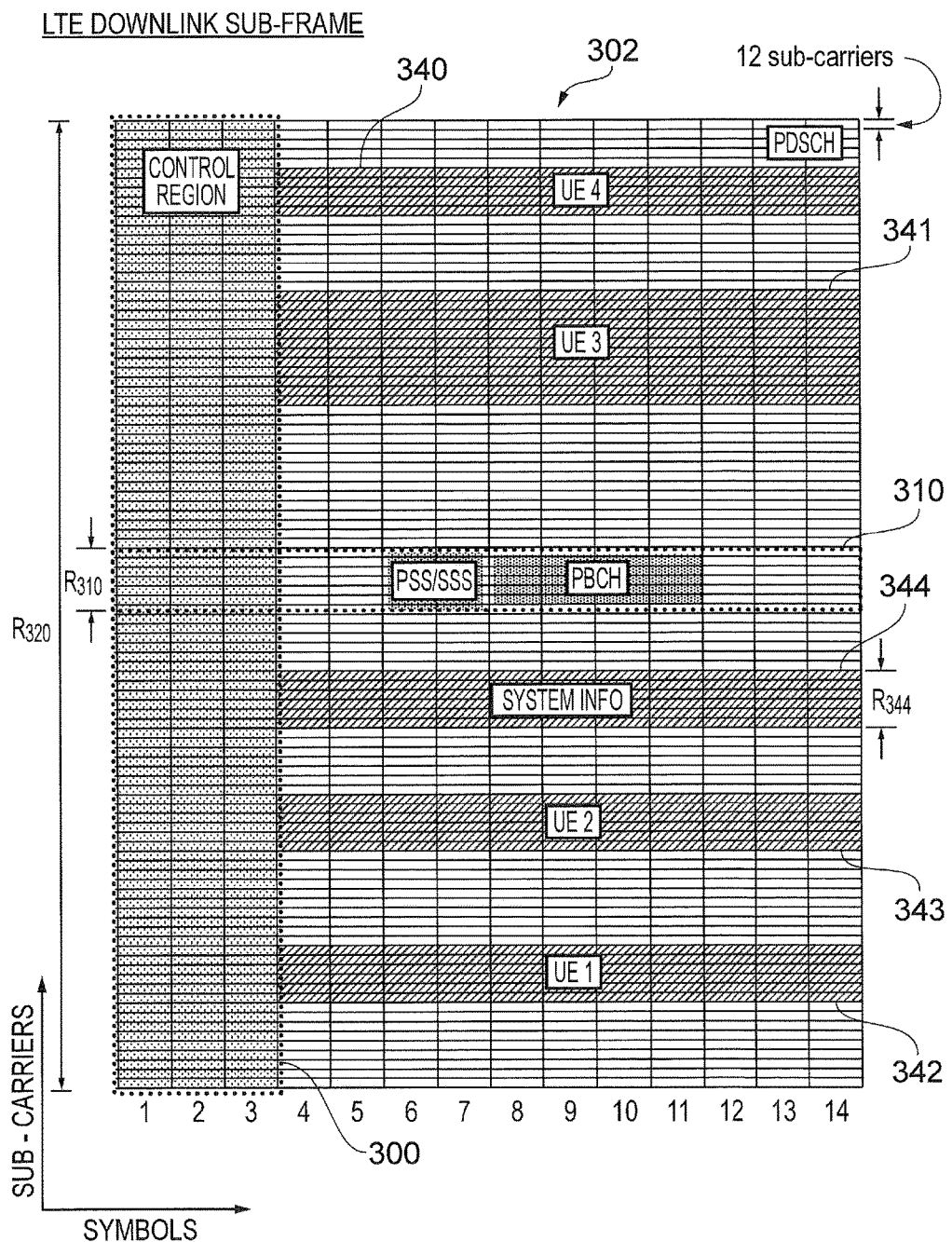
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of "symbols", which are each transmitted over a respective 1/14 ms period. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 symbols and 1200 sub-carriers spread across a 20 MHz bandwidth, $R_{320}$. The smallest allocation of user data for transmission in LTE is a "resource block" (RB) or "physical resource block" (PRB) comprising twelve sub-carriers transmitted over one slot (0.5 sub-frame). Each individual box in the sub-frame grid in FIG. 3 corresponds to twelve sub-carriers transmitted on one symbol.

FIG. 3 shows in hatching resource allocations for four LTE terminals 340, 341, 342, 343 from within a total shared resource 302. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on. These resources are allocated to the UEs using resource allocation messages transmitted in the host control channel 300.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific communications devices (UE). Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow a communications device to achieve frame synchronisation and determine the cell identity of the enhanced Node B transmitting the downlink signal. The PBCH carries information about the cell, comprising a master information block (MIB) that includes parameters which communications devices use properly to access the cell. Data transmitted to individual LTE terminals on the physical downlink shared channel (PDSCH) can be transmitted in other resource elements of the sub-frame.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional communications device must be able to receive the entire channel bandwidth in order to receive and decode the control region.

Virtual Carrier

Figure 4:
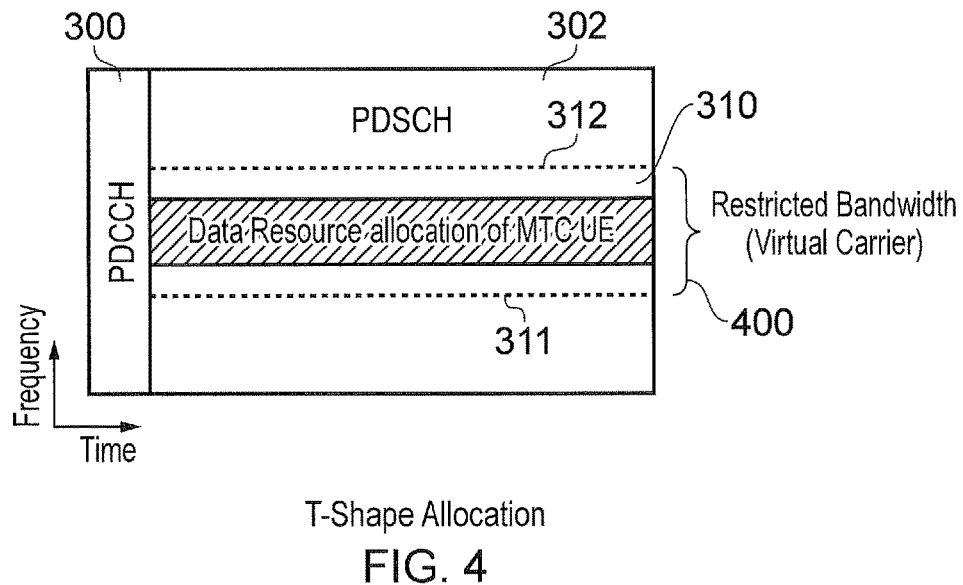
FIG. 4 provides a schematic diagram illustrating an example of an LTE downlink radio sub-frame in which a narrow band virtual carrier has been inserted at the centre frequency of the host carrier, the virtual carrier region abuts the wideband PDCCH control region of the host carrier, which is making a characteristic "T-shape"
Figure 5:
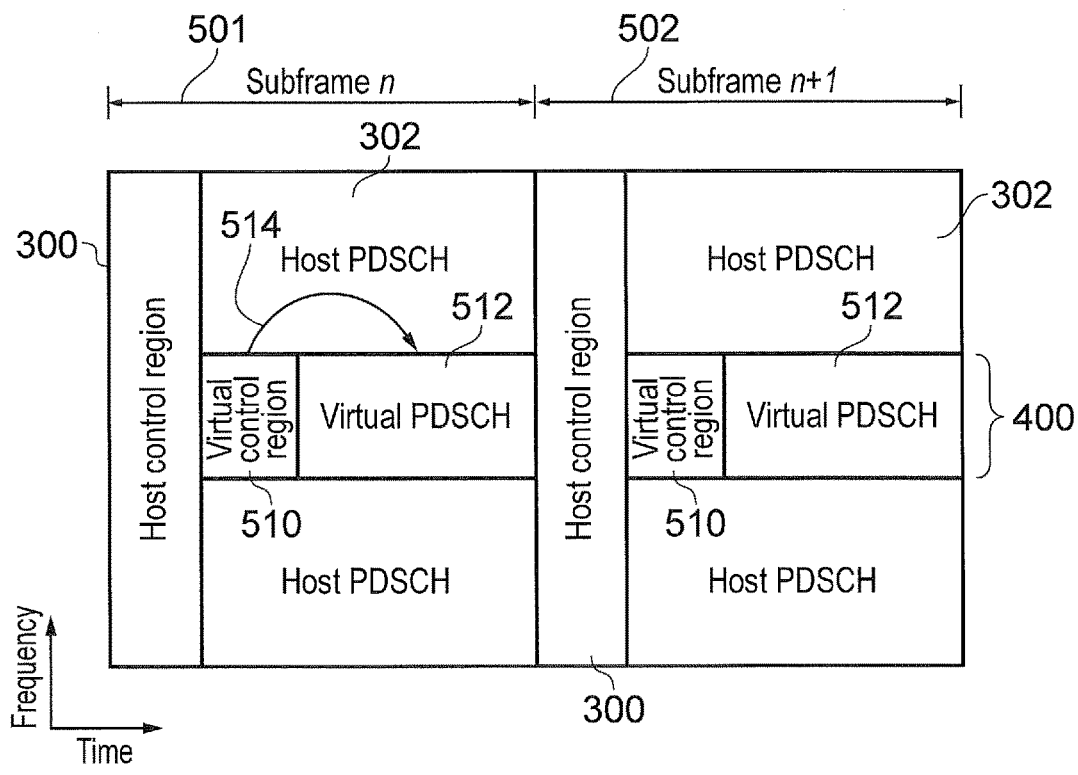
FIG. 5 provides a schematic diagram illustrating an example of two LTE downlink sub-frames in which a virtual carrier is present, which supports reduced capability communications devices which can only receive signals from within the virtual carrier and therefore includes a control region within the virtual carrier (VC-PDCCH)

Previous co-pending applications have discussed in detail the design and operation of some parts of a so-called virtual carrier (VC), embedded in a classical host carrier (HC), suitable for use particularly in LTE networks serving machine-type communication (MTC) devices among their mix of user equipment terminals (UEs). FIGS. 4 and 5 provide an example of illustration of two different forms of virtual carrier arrangement which are arranged to support two different forms of reduced capability communications devices, which as explained above, are referred to as VC-UEs.

FIG. 4 schematically represents an arbitrary downlink sub-frame according to the established LTE standards as discussed above into which an instance of a virtual carrier 406 has been introduced. One particular version of the VC design is a so-called 'T-shaped' VC, which is shown in FIG. 4. A more detailed description of a T-shaped virtual carrier may be found in co-pending patent application number GB 1121767.6 [11]. The sub-frame is in essence a simplified version of what is represented in FIG. 3. Thus, the sub-frame comprises a control region 400 supporting the PCFICH, PHICH and PDCCH channels as discussed above and a PDSCH region 402 for communicating higher-layer data (for example user-plane data and non-physical layer control-plane signalling) to respective communications devices, as well as system information, again as discussed above. For the sake of giving a concrete example, the frequency bandwidth (BW) of the carrier with which the sub-frame is associated is taken to be 20 MHz. Also schematically shown in FIG. 4 by black shading is an example PDSCH downlink allocation 404. In accordance with the defined standards, and as discussed above, individual communications devices derive their specific downlink allocations 404 for a sub-frame from PDCCH transmitted in the control region 400 of the sub-frame.

In FIG. 4 PDCCH 300 is shown with a PDSCH 302 providing a shared resource which is allocated to communications devices generally. The sub-frame shows the entire bandwidth of the host carrier or system bandwidth. Within the shared communications resources 302 there is provided a reserved section of resources within a restricted bandwidth 310 within dotted lines 311, 312 which represents a virtual carrier. According to the arrangement shown in FIG. 4 reduced capability devices (VC-UE) of a first type receive allocations of communications resources within the virtual carrier from resource allocation messages transmitted by the eNodeB 101 from the control channel 300, which for the example of LTE is a conventional PDCCH and therefore extends the whole of the system bandwidth but is only 1 to 3 resource blocks wide in time.

By contrast with the conventional LTE arrangement, where a subset of the available PDSCH resources anywhere across the full PDSCH bandwidth could be allocated to a UE in any given sub-frame, in the T-shaped arrangement illustrated in FIG. 4, VC-UEs maybe allocated PDSCH resources only within a pre-established restricted frequency band 406 corresponding to a virtual carrier. Accordingly for the T-shape virtual carrier arrangement the VC-UEs of the first type are allocated resources from virtual carrier shared communications resources from the control channel of the host or system carrier control channel 300, which for the example of LTE is the PDCCH.

In contrast the second type of VC-UE is configured to receive data using a wireless access interface for the downlink configured as shown for example in FIG. 5. FIG. 5 provides an example of a downlink of a wireless access interface comprising two sub-frames 501, 502 in which there is provided a conventional host control region or PDCCH 300, which corresponds to the example shown in FIGS. 3 and 4. However in contrast to the arrangement shown in FIG. 4, VC-UEs of the second type are only able to operate over the restricted bandwidth 400 which is the bandwidth of the virtual carrier within the shared resources 302. A VC-UE of the second type is therefore able to take advantage of reduced costs, because the radio frequency part only needs to receive signals within the reserved frequency range of the virtual carrier bandwidth. A VC-UE of the second type therefore cannot receive any of the transmissions in the host control region (host PDCCH, PCFICH, MUCH, CRS). This provides further cost saving benefits since a radio frequency part of the UE's receiver will only be required to receive signals in the reduced bandwidth and control information does not need to be received across the entire system bandwidth. However, a technical problem exists if the VC-UEs of the first type must operate on the same wireless access interface of the VC-UEs of the second type, because VC-UEs of the first type will not be compatible. This is because VC-UEs of the first type may be allocated resource blocks of the shared channel (VC-PDSCH) in the first slot of the sub-frame illustrated in FIG. 5 would assume that the shared channel (PDSCH) occupied all resource elements in those resource blocks except for known reference signals and synchronization signals. However, some resource elements are in fact being used to provide VC-UEs of the second type with a control channel in the virtual carrier (VC PDCCH), of which VC-UEs of the first type are unaware. This is because VC-UEs of the first type would assume that they must decode signals within the allocated resources of the shared channel (PDSCHs) including the resource elements which contain the control channel within the virtual carrier for VC-UEs of the second type. The VC-UEs of the first type will be unaware of the control channel within the virtual carrier and would therefore be prone to much higher rates of decoding failure leading to unreliable or inefficient operation for VC-UEs of the first type.

According to one example the VC-UEs of the first type which are configured to operate with a T-shaped virtual carrier as specified for example in accordance with a UE capability or category which may be defined in one version of the LTE specification (e.g. LTE release-12), whereas the VC-UEs of the second type are configured to operate with a virtual carrier which includes a control channel within the reserved bandwidth of the virtual carrier in accordance with a UE capability or category which may be defined in the same or a later version of the LTE specification (E.g. LTE release-13), although the specifications defining the two virtual carriers might be denominated as any particular releases including both categories/types of UE defined in the same release.

It is possible to work around this problem by introducing scheduling restrictions to the eNodeB to allocate only resource elements of the shared communications channel of the virtual carrier (VC-PDSCH) outside the control channel (VC-PDCCH). For example, any resource block in the virtual carrier containing both PDSCH and PDCCH should only be scheduled to VC-UEs of the second type, or only sub-frames containing no communications resources allocated to a VC-UE of the second type can be scheduled to VC-UEs of the second type. However, such scheduling restrictions could cause an eNodeB scheduling complexity caused by scheduling restrictions. Such scheduling restrictions could also lead to inefficient use of resources in cases where for example a resource block could be reserved to only VC-UEs of the second type. However, in general VC-UEs will typically receive only a relatively small amount of data and so will not require all the reserved resources of the shared channel of the virtual carrier to be allocated in one sub-frame. As such the remaining communications resources may be wasted, because these cannot be shared also with VC-UEs of the first type. In the case of sub-frame separation, the same issue arises but since the amount of reserved resources can be higher, the potential inefficiency is also higher.

According to present technique an arrangement is provided for the co-existence of VC-UEs of the first type and VC-UEs of the second type which operate to receive data from the shared resources of the virtual carrier (virtual carrier PDSCH). As will be appreciated VC-UEs of the first type which receive resource allocation messages from the host control region 300 will not be aware of the existence of the virtual control region 510 within the virtual carrier shared resources, which for LTE is the PDSCH 512. Accordingly, a VC-UE of the first type which receives resource allocation messages from the conventional host control region 300 will attempt to decode data transmitted from within the virtual carrier shared channel within the sub-frame 501, 502 but will not be aware that some of the PRBs of the virtual carrier will be within the virtual carrier control region 510. Accordingly this will represent puncturing or loss of data which a VC-UE of the first type may be able to recover as a result of modulation and coding schemes and communications protocols used for the communication of data within the virtual carrier shared channel 512. However, relying on the modulation, coding and communications protocols of the transmitter/receiver chain where it is not known that some of the PRBs do not contain signals representing data being transmitted can represent a sub optimal use of communications resources and can result in a degradation of performance for the VC-UEs of the first type.

Configuration of Virtual Carrier Control Region

According to one example embodiment of the present technique a communications device is configured to receive data from a wireless access interface transmitted by a mobile communications network. The wireless access interface provides a plurality of communications resource elements within a system bandwidth providing a host frequency range of a host carrier and a reserved section of the communications resources within a reserved frequency range for preferable allocation to reduced capability devices. The reserved frequency range is within the host frequency range and forms a virtual carrier, and in each of a plurality of time divided units, the wireless access interface provides a shared channel of communications resources and a control channel formed within the communications resources of the system bandwidth of the host frequency range for communicating resource allocation messages to communications devices. The resource allocation messages allocate the communications resources of the shared channel to the communication devices within the system bandwidth and allocate the communications resources of the reserved frequency range to the reduced capability devices. The reserved frequency range of the communications resources within the host frequency range includes one or more communications resources which are not allocated for transmitting data to the reduced capability devices, because these have been allocated for a different purpose for example forming a control channel within the virtual carrier. A reduced capability device receives a resource allocation message from the control channel of the communications resources of the system bandwidth, which allocates resources within the reserved communications resources of the virtual carrier for receiving data. The reduced capability device determines the communications resources of the reserved communications resources which will contain signals representing the data from the communications resources allocated within the reserved communications resources by the received resource allocation message and excluding any of the one or more communications resources which are not allocated for transmitting data to the reduced capability devices within the allocated communications resources, and receives the data from the determined communications resources of the reserved communications resources of the virtual carrier.

The transmission parameters and the receiving parameters are rate matched to the remaining communications resources. A more efficient use of communications resources is thereby provided.

In an example in which a mobile communications network is deployed to support VC-UEs of the second type (for example an LTE network deployment which uses features defined in 3GPP Release-13) then the network would set the signalling to identify to a VC-UE of the first type that some of the resources are reserved/unused. The VC-UE of the second type would then be configured to and scheduled using the control information in the virtual control region. Accordingly the VC UEs of the first type and the second type would both be able to use the same virtual carrier (narrowband region) without interoperability issues. An eNodeB would schedule PDSCH resources using rate matching to VC-UEs of the first type using the host PDCCH (full bandwidth) and schedule resources from the same restricted subset of PDSCH resources to a VC-UE of the second type using the virtual control region.

Embodiments of the present technique can provide an arrangement in which the VC-UEs of the first type are provided with an indication from the mobile communications network, of at least the presence of reserved resources within the virtual carrier. An example representation is provided for example by the diagram shown FIG. 6 which corresponds to that shown in FIGS. 4 and 5, but adapted to allow VC-UEs of the first type and the second type to operate within the same downlink sub-frame of a wireless access interface.

Figure 6:
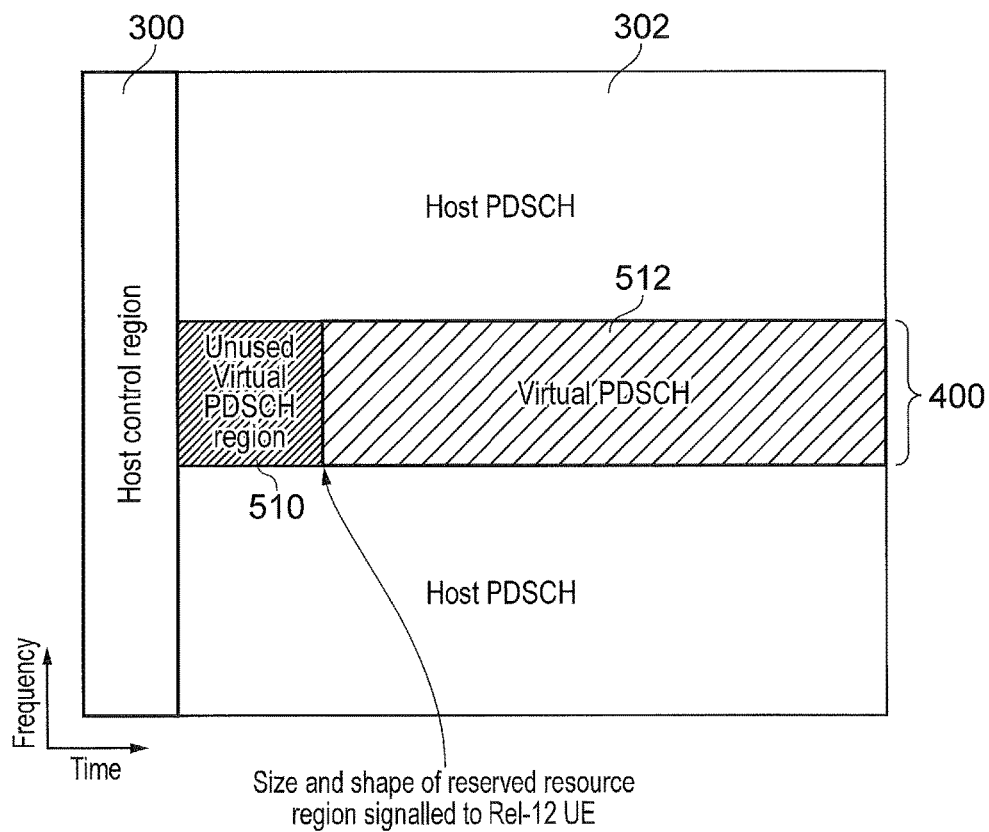
FIG. 6 provides a schematic representation of a downlink sub-frame of an LTE wireless access interface in which a region of the virtual carrier is reserved for a control region.

As shown in FIG. 6 a sub-frame of a downlink carrier of a host system is shown with a virtual carrier within a restricted bandwidth 400 providing shared resources within a virtual carrier shared region 512 and the virtual carrier control region 510. As explained above the arrangement of a control region 510 within the virtual carrier provides a facility for the VC-UEs of the second type to receive resource allocation messages for resources of the shared channel within the restricted or reserved baseband of the virtual carrier so that the VC-UEs of the second type can have a reduced bandwidth operation for both baseband processing and a radio frequency bandwidth. However, within the same sub-frame a VC-UE of a first type maybe allocated communications resources of the virtual carrier shared channel 512 using resource allocation messages transmitted within the conventional host control region 300.

In accordance with one example embodiment of the present technique VC-UEs of the first type are informed of the presence of reserved resources 512 within the shared channel resources of the virtual carrier 512. Accordingly, the VC-UEs of the first type are configured to adapt the operation of their receivers to use only the resources within the remaining part of the shared channel 512, that is, after the reserved region 512. As will be explained there are various embodiments, which include providing an indication of the location of the reserved resources or configuring the VC-UEs of the first type to search for and to detect signals conveying data to them within the virtual carrier shared channel blindly, that is without knowing whether or not a reserved resources region is present within the virtual carrier.

Signalling of Reserved Resources

Figure 7:
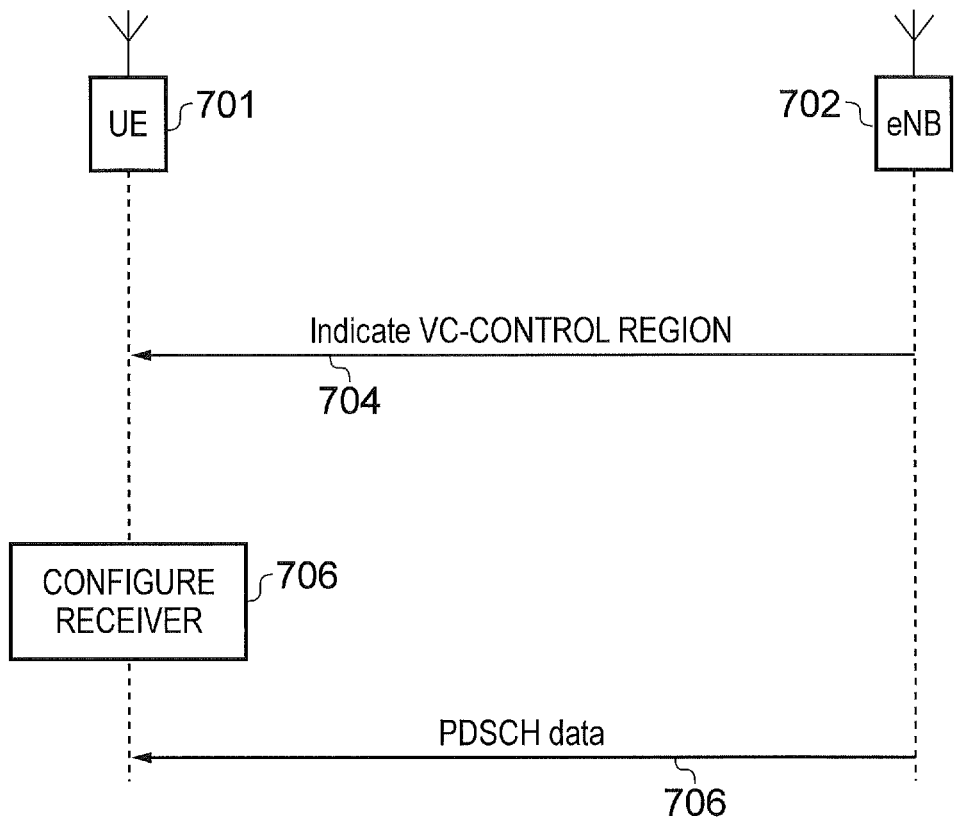
FIG. 7 is a part schematic diagram part flow diagram illustrating an arrangement in which a reduced capability device (VC-UE) receives an indication that there is a virtual carrier control region present within a virtual carrier and configures its receiver to receive data transmitted in a shared channel which has been rate matched to the remaining communications resources with a virtual carrier allocation.

As represented by a part schematic, part flow diagram shown in FIG. 7, a VC-UE of the first type is configured to receive an indication from an adapted eNodeB 702 that there is a reserved region 512 present within the virtual carrier. This information could be transmitted using different control channels, but is represented generally as a signalling message or a signalling event comprising a series of messages 704. As will be explained shortly, after receiving an indication of at least the presence of the reserved region 512, the VC-UE 701 is configured to adapt its receiver to receive data from the VC shared channel to take account of the reserved region, which is represented by a down-link transmission arrow 706. The adaptation of the receiver by the VC-UE 701 is represented generally as a process 708, which may include rate-matching as will be explained in more detail below.

Signalling the presence of the reserved region 512 could be achieved in one example either in the host carrier control region 300 (PDCCH), or potentially sent in system information (SI), which is carried in a broadcast PDSCH in a restricted subset of resource. In the case in which the signalling is sent in a host carrier control region (PDCCH), the signalling could be included as a new field in an existing downlink control information (DCI) message or a new DCI message which conveys the signalling information.

In the example of extending an existing DCI format to convey the indication of the VC control channel 704, a VC-UE of the first type could adapt its receiver to search for a PDCCH if there was a higher-layer configuration of whether to expect the DCI format to be extended or not. If using a new DCI format, the UE would in any case require configuration as to which DCI messages to include in its PDCCH decoding process. This configuration is usually implicit from a Transmission Mode configuration and/or RNTI configuration.

For an example of an LTE network, the presence or location of a reserved region may be signalled to the VC-UEs of a first type in a System Information Block (SIB). According to this example, the eNodeB 702 would need to ensure that the relevant SIB is sent in resource blocks and sub-frames which are not affected by the virtual carrier control region provided to the VC-UEs of the second type, as well as VC-UEs for the first type.

The signalling indication 704 provided by the mobile communications network can also convey or be accompanied by a configuration of which sub-frames the reserved region applies to. For the system information block (SIB) broadcast signalling, the indication of the reserved region would typically be a sub-frame pattern per radio frame or per four radio frames. For an example of physical layer signalling, according to one embodiment an indication is provided of the reserved region with an indication of how many consecutive sub-frames the indication is valid. In another example, the signalling message 704 could include a bitmap of length corresponding to some number of sub-frames wherein a bit value of '1' indicates that the VC-PDCCH indication applies in the sub-frame the bit corresponds to, and a bit value of '0' indicates it does not apply (or vice-versa).

An alternative to the above signalling is to define that the indication is simply an 'on/off' indication of whether there is a VC control region in operation. Such a configuration could be identified in DCI or higher layer signalling. Furthermore, if it is assumed or specified that the PCFICH is present in the virtual carrier control region for the VC-UEs of the second type, when the VC-UE of the first type is provided with a positive indication of the presence of a VC control region, by simply reading the VC-PCFICH to determine the extent of the virtual carrier control region. The VC-UE of the first type can assume that the VC-PCFICH spans the resource blocks indicated for the T-shape carrier arrangement of FIG. 4, because the VC-UEs of the first type are being arranged in co-existence with the VC-UEs of the second type.

A further use of PCFICH could be to couple together the values of PCFICH and VC-PCFICH, such that, for example, they indicate a certain total control duration. For example, if it is specified that PCFICH+VC-PCFICH always covers five OFDM symbols, then when a communications device is provided with an indication that VC-UEs of the second type are being supported, then the communications devices are configured to recognise that if for example a PCFICH=2, then VC-PCFICH=3. According to this arrangement a scheduler in the eNodeB 702 would be required to take account of this additional constraint, especially to ensure the VC control region is provided with sufficient communications resources. The total symbol constraint could be easily specified, or contained in broadcast information for VC-LTEs of the first type, wherein the eNodeB does not need to send the broadcasted constraint value unless it is also indicating its use of VC control region.

Form of VC-Control Region

Figure 8:
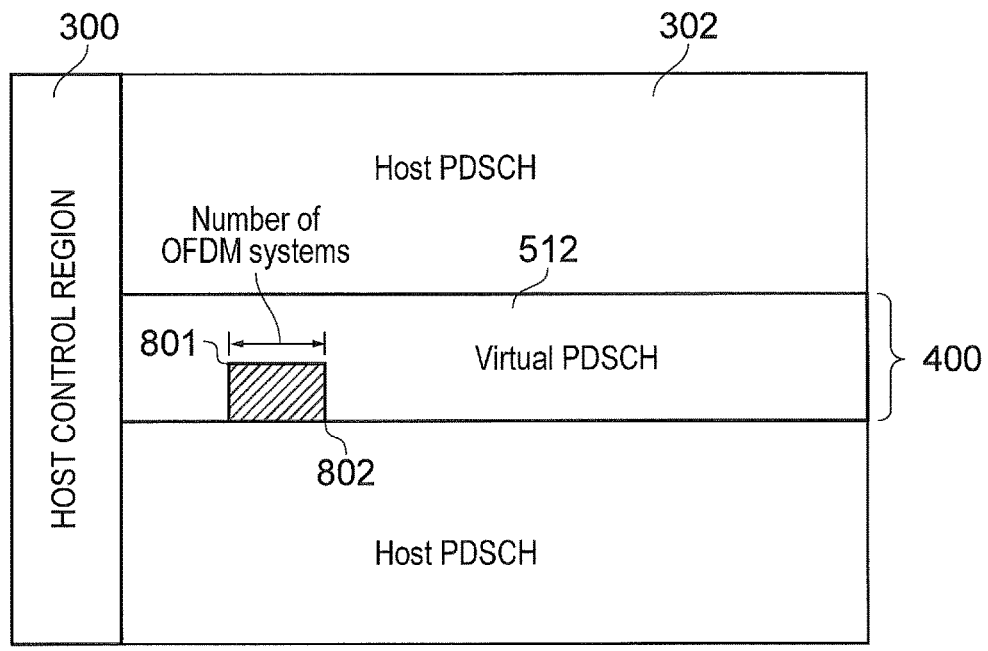
FIG. 8 is a schematic representation of a further example of a downlink sub-frame of an LTE wireless access interface in which a region of the virtual carrier is reserved for a control region.

In the simplest and most likely implementation, the VC control region could just be a number of OFDM symbols, as represented as a rectangular region 510 of the down-link sub-frame shown in FIG. 6. With this example, the VC control region 510 results in a reserved region exactly in the shape shown in FIG. 6 spanning the full bandwidth of the virtual carrier. In more flexible implementations, such as the example shown in FIG. 8, the VC control region could be a number of OFDM symbols and the signalling indication 704 indicates the sub-carriers at the top left 801 and bottom right 802 corner of the rectangle.

In an example deployment in which a mobile communications network is configured to support only VC-UEs of the first type (for example an LTE network which uses features defined in 3GPP Release-12), the size of the reserved region would most likely be set to zero. This would mean that only T-shaped virtual carrier allocation is supported and the shared communications resources of the virtual carrier would be available to be allocated to the VC-UEs of the first type (PDSCH). Alternatively, the VC-UEs of the first type could be pre-specified (e.g. in Release-12 specifications) to contain a default value for the reserved region such that, if the UE is not configured with any value, the UE assumes that the size of the VC control region is zero. According to this example, there is no need to provide for a signalling message 704 indicating the presence of a control region, which avoids redundant signalling for mobile communications networks which may only support VC-UEs of the first type (network deployment supporting features up to Release-12).

Adaptation of Receiver

Figure 9:
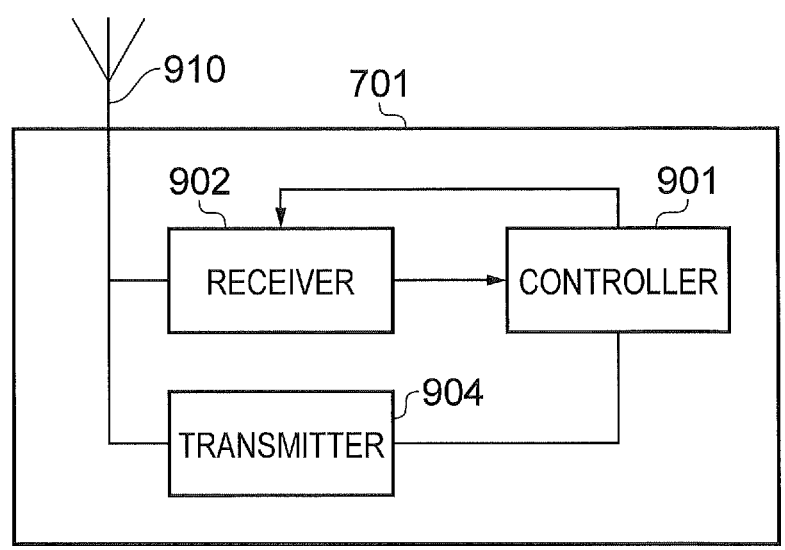
FIG. 9 is a schematic block diagram of a communications device which is arranged to operate as a reduced capability device in accordance with the present technique.

A communications device which may operate as a VC-LTE of the first type 701 is shown in FIG. 9. In FIG. 9 is the VC-UE 701 is shown to include a controller 901 which is coupled to a receiver 902 and a transmitter 904. Both the transmitter 904 and the receiver 902 are connected to an antenna 910. In accordance with the present technique, the signalling indication 704 indicating the presence of a reserved region is received by the receiver 902 and detected by the controller 901. In accordance with the detected presence of a reserved region and where the VC-UE is acting as a VC-UE according to the first type, the controller 901 is configured to adapt the receiver 902 to the effect that the transmission of the data by the mobile communications network within the remaining part of the shared communications channel of the virtual carrier (VC-PDSCH) is adapted for example using rate matching. Accordingly, communications resources of the wireless access interface can be used more efficiently.

In another example embodiment a mobile communications network may not provide an indication by signalling of the presence of a reserved region within the virtual carrier, but the VC-UE of the first type may be pre-configured to search for signals representing data being communicated within the VC shared communications channel (VC-PDSCH). According to this example therefore, VC-UEs of the first type could be required to blindly search for their PDSCH within a resource block that occurs in the first slot of a sub-frame of a virtual carrier (or whichever slot is used for VC PDCCH). Correspondingly, the eNodeB 702 would apply rate matching, rather than puncturing, to transmit the data to the VC-UE of the first type in the virtual carrier shared communications channel (VC-PDSCH). VC-UEs of the first type would try first decoding PDSCH assuming zero VC control region, then by trying e.g. a 1 symbol wide rate matching assumption, then 2 symbols, etc. until the data can be successfully decoded. In a mobile communications network which is configured to support VC-UEs of the first type only, that is where there is no VC control region, then the first attempt with zero VC control region would be successful.

Figure 10:
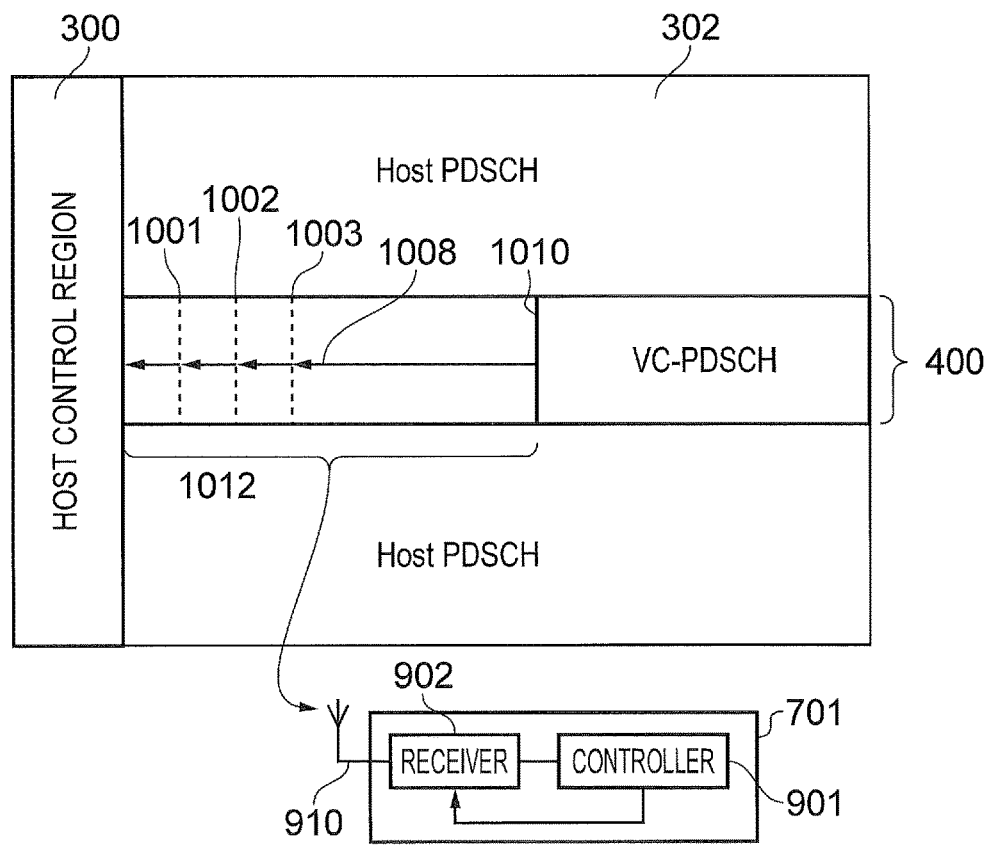
FIG. 10 is a schematic representation part block diagram providing a representation of an arrangement in which a reduced capability device (VC-UE) performs a blind search for signals representing data transmitted within the shared channel of a virtual carrier.

An illustration of such an arrangement is shown in FIG. 10 which shows a sub-frame of a downlink of a wireless access interface configured for example in accordance with LTE. FIG. 10 corresponds substantially to the examples shown in FIGS. 4, 5, 6 and 8 and so a full description will not be repeated here. However in FIG. 10 dotted lines 1001, 1002, 1003, represent different possible boundaries of a VC control region (VC PDCCH) for VC-UEs of the second type. The arrows 1008 within the region marked by a boundary line 1010 represent possible search ranges for blind searching signals representing data transmitted to a VC-UEs of the first type. The signals are extracted from a possible region 1012 and processed by the receiver 902 under the control of the controller 901 of a VC-UE of the first type 701. Therefore the communications resources of the shared channel in which a VC-UE of the first type 701 is expecting to receive data within the virtual carrier 400 is represented by a section indicator 1012. Then if there is a VC control region present within the virtual carrier 400 then the arrows 1008 represent possible ranges of signals which are recovered and processed by the receiver 902 in order to detect the data to be received by the VC-UE of the first type 701.

If this example were to be combined with the coupled PCFICH/VC-PCFICH described above, then instead of either a pre-configuring of the VC-UE of the signalling indicating a fixed certain total number of control symbols, the PCFICH/VC-PCFICH could indicate a fixed maximum number of symbols of the VC control region, so that the controller 901 of the VC-UE could constrain a blind search for receiving the data within the shared channel to be within this maximum number of symbols.

As a further adaptation of this embodiment, where the signalling indication 704 provides a simple binary 'yes/no' indicating the presence or absence of the VC control region, the VC-UE of the first type would configure the receiver 902 using the controller 901 to blind search for signals representing data being transmitted to the VC-UE of the first type in the VC shared resources (VC-PDSCH) when the signalling indication 704 indicates the presence of the VC control region. Correspondingly a 'no' provided by the signalling indication 704, which would be the case in a mobile communications network configured only for VC-UEs of the first type or a network supporting VC-UEs of the second type but for sub-frames in which there was no VC control channel scheduled, the VC-UE assumes that no rate matching is performed. When 'yes', the VC-UE performs blind searches as described above. A further adaptation would allow the signalling indication 704 to indicate the set of blind searches, which the VC-UE of the first type should conduct. This 'yes/no' signalling indication 704 would most naturally be semi-statically configured by higher-layers, probably in a dedicated radio resource control (RRC) layer configuration rather than broadcast, but in general could also be carried at the physical layer in the manners discussed above.

Various further aspects and features of the present technique are defined in the appended claims. The following numbered clauses provide further example aspects:

1. A communications device for receiving data from a mobile communications network, the mobile communications network including infrastructure equipment providing a wireless access interface for the communications device, the communications device comprising:

a transmitter adapted to transmit signals to the mobile communications network via the wireless access interface, a receiver adapted to receive signals from the mobile communications network via the wireless access interface, and a controller for controlling the transmitter and the receiver to transmit and to receive the signals in accordance with the wireless access interface, the wireless access interface providing a plurality of communications resources within a system bandwidth providing a host frequency range of a host carrier, reserved communications resources for preferable allocation to reduced capability devices, the reserved communications resources forming a virtual carrier, and in each of a plurality of time divided units, a shared channel of the communications resources and a control channel formed within the communications resources of the system bandwidth of the host frequency range for communicating resource allocation messages to communications devices, the resource allocation messages for allocating the communications resources of the shared channel to the communication devices within the system bandwidth and for allocating communications resources of the reserved communications resources to the reduced capability devices, wherein the reserved communications resources include one or more communications resources which are not allocated for transmitting data to the reduced capability devices, and the controller is configured with the receiver to receive a resource allocation message from the control channel of the communications resources of the system bandwidth, allocating resources within the reserved communications resources of the virtual carrier for receiving data, to determine the communications resources of the reserved communications resources which will contain signals representing the data from the communications resources allocated within the reserved communications resources by the received resource allocation message and excluding any of the one or more communications resources allocated by the resource allocation message which are not allocated for transmitting data to the reduced capability devices within the allocated communications resources, and to receive the data from the determined communications resources of the reserved communications resources of the virtual carrier.

2. A communications device according to clause 1, wherein the communications device is a reduced capability device of a first type, which can receive the resource allocation messages from within the control channel, being a first control channel, within the system bandwidth of the host frequency range, and the one or more communications resources which are not allocated for transmitting data to the reduced capability devices of the first type are used to provide a second control channel within the reserved bandwidth of the virtual carrier for transmitting resource allocation messages to reduced capability devices of a second type which can only receive signals from within the reserved frequency range of the virtual carrier.

3. A communications device according to clause 1 or 2, wherein the infrastructure equipment is configured to transmit to the reduced capability devices a signalling indication that a part of the communications resources of the shared channel allocated by the resource allocation message within one or more of the time-divided units of the reserved communications resources include one or more communications resources which are not allocated for transmitting data to the reduced capability devices, and the controller is configured with the receiver to receive from the infrastructure equipment of the mobile communications network the signalling indication that the reserved communications resources of the virtual carrier include one or more communications resources allocated by the resource allocation message which are not allocated for transmitting data to the reduced capability devices, and to detect the data from the signals received from the communications resources which have been determined to convey the signals representing the data from the allocated communications resources and excluding any of the one or more communications resources which are not allocated for transmitting data to the reduced capability devices.

4. A communications device according to clause 1, wherein the controller and the receiver are configured to determine the communications resources of the reserved communications resources which will contain signals representing the data by searching for the data within the communications resources allocated by the resource allocation message, for each of one or more sets of the one or more communications resources which are not allocated for transmitting data to the reduced capability devices.

5. A communications device according to clause 3, wherein the signalling indication that the reserved communications resources include one or more communications resources which are not allocated for transmitting data to the reduced capability devices, identifies the one or more communications resources as one or more resources elements of the reserved communications resources, which provide the second control channel, and the controller is configured with the receiver to receive the data from signals representing the data which are transmitted in communications resources allocated by the resource allocation message to the communications device which do not include the one or more communications resources which do not include the data.

6. A communications device according to clause 3, wherein the signalling indication that the reserved communications resources include one or more communications resources which are not allocated for transmitting data to the reduced capability devices does not identify the one or more communications resources as one or more resource elements of the reserved communications resources, and the controller and the receiver are configured to determine the communications resources of the reserved communications resources which will contain signals representing the data by searching for the data within the communications resources of the reserved communications resources allocated by the resource allocation message, for each of one or more possible sets of the one or more communications resources which are not allocated for transmitting data to the reduced capability devices.

7. A communications device according to any of clauses 1 to 6, wherein the infrastructure equipment is configured to match transmission parameters of the data being transmitted to the reserved communications resources of the virtual carrier in which the signals representing the data may be transmitted, and the controller is configured in combination with the receiver to match receiver parameters to the transmission parameters to detect and to recover the data from the communications resources allocated by the resource allocation message excluding any of the one or more communications resources which are not allocated for transmitting data to the reduced capability devices.

8. A communications device according to clause 2, wherein the reduced capability device of the first type is configured to operate in accordance with a first capability or category and the reduced capability device of the second type is configured to operate in accordance with a second capability or category.

9. A communications device according to clause 8, wherein the first capability or category is introduced in a first version of a specification relating to an operation of the communications device, the mobile communications network, the infrastructure equipment or the wireless access interface and the second capability or category is introduced in a second version of a specification relating to the operation of the communications device, the mobile communications network, the infrastructure equipment or the wireless access interface.

10. A communications device according to clause 9, wherein the first version of the specification relating to the communications device, the mobile communications network, the infrastructure equipment or the wireless access interface and the second version of the specification relating to the communications device, the mobile communications network, the infrastructure equipment or the wireless access interface are different releases of a specification pertaining to an Evolved Universal Terrestrial Radio Access Network.

11. A communications device according to any of clauses 1 to 10, wherein the reserved communications resources of the host frequency range are within a reserved frequency range within the host frequency range.

12. A communications device according to any of clauses 1 to 11, wherein the reserved communications resources comprise one or more resource blocks, each of the resource blocks comprising one or more resource elements, and the one or more communications resources which are not allocated for transmitting data to the reduced capability devices comprise one or more resource elements.

13. A communications device according to clause 12, wherein the wireless access interface is formed from Orthogonal Frequency Division Multiplexed, OFDM, symbols generated in the frequency domain from a plurality of sub-carriers, and a resource element comprises a sub-carrier of an OFDM symbol.

14. A method of receiving data from a mobile communications network at a communications device, the mobile communications network including infrastructure equipment providing a wireless access interface for the communications device, the method comprising:

controlling a transmitter to transmit signals to the mobile communications network via the wireless access interface, controlling a receiver to receive signals representing the data from the mobile communications network via the wireless access interface, the wireless access interface providing a plurality of communications resource elements within a system bandwidth providing a host frequency range of a host carrier, reserved communications resources for preferable allocation to reduced capability devices, the reserved communications resources forming a virtual carrier, and in each of a plurality of time divided units, a shared channel of the communications resources and a control channel formed within the communications resources of the system bandwidth of the host frequency range for communicating resource allocation messages to communications devices, the resource allocation messages for allocating the communications resources of the shared channel to the communication devices within the system bandwidth and for allocating communications resources of the reserved communications resources to the reduced capability devices, wherein the reserved communications resources include one or more communications resources which are not allocated for transmitting data to the reduced capability devices, and the controlling the receiver includes receiving a resource allocation message from the control channel of the communications resources of the system bandwidth, allocating resources within the reserved communications resources of the virtual carrier for receiving data, determining the communications resources of the reserved communications resources which will contain signals representing the data from the communications resources allocated within the reserved communications resources by the received resource allocation message and excluding any of the one or more communications resources allocated by the resource allocation message which are not allocated for transmitting data to the reduced capability devices within the allocated communications resources, and receiving the data from the determined communications resources of the reserved communications resources of the virtual.

15. An infrastructure equipment for forming part of a mobile communications network for transmitting data to or receiving data from communications devices, the infrastructure equipment comprising a transmitter adapted to transmit signals representing the data to the communications devices via a wireless access interface, a receiver adapted to receive signals from the communications devices via the wireless access interface, and a controller for controlling the transmitter and the receiver to transmit or to receive the signals in accordance with the wireless access interface, the wireless access interface providing a plurality of communications resources within a system bandwidth providing a host frequency range of a host carrier, reserved communications resources for preferable allocation to reduced capability devices, the reserved communications resources forming a virtual carrier and in each of a plurality of time divided units, a shared channel of the communications resources and a control channel formed within the communications resources of the system bandwidth of the host frequency range for communicating resource allocation messages to communications devices, the resource allocation messages for allocating the communications resources of the shared channel to the communication devices within the system bandwidth and for allocating communications resources of the reserved communications resources to the reduced capability devices, wherein the reserved section of the communications resources include one or more communications resources which are not allocated for transmitting data to the reduced capability devices, and the controller is configured with the transmitter to transmit a resource allocation message via the control channel of the communications resources of the system bandwidth, the resource allocation message allocating resources within the reserved communications resources of the virtual carrier for a reduced capability device, and to determine the communications resources of the reserved communications resources in which signals representing the data can be transmitted, from the communications resources allocated within the reserved communications resources and excluding any of the one or more communications resources allocated by the resource allocation message which are not allocated for transmitting data to the reduced capability devices, and to transmit the data in determined communications resources of the reserved communications resources of the virtual carrier.

16. An infrastructure equipment according to clause 15, wherein the communications device is a reduced capability device of a first type, which can receive the resource allocation messages from within the control channel, being a first control channel, within the system bandwidth of the host frequency range, and the controller is configured to control the transmitter and the receiver to transmit or to receive the signals in accordance with the wireless access interface to provide a second control channel within the reserved bandwidth of the virtual carrier for transmitting resource allocation messages to reduced capability devices of a second type which can only receive signals from within the reserved frequency range of the virtual carrier, the second control channel being formed from the one or more communications resources which are not allocated for transmitting data to the reduced capability devices.

17. An infrastructure equipment according to clause 15 or 16, wherein the controller is configured in combination with the transmitter to transmit to the reduced capability devices a signalling indication that a part of the communications resources of the shared channel allocated by the resource allocation message within one or more of the time-divided units of the reserved communications resources include one or more communications resources which are not allocated for transmitting data to the reduced capability devices, and the reduced capability device is configured to detect the signalling indication and to detect the data from the signals received from the communications resources which have been determined to convey the signals representing the data from the communications resources allocated by the resource allocation message and excluding any of the one or more communications resources which are not allocated for transmitting data to the reduced capability devices.

18. An infrastructure equipment according to clause 15, wherein the signalling indication that the reserved communications resources include one or more communications resources which are not allocated for transmitting data to the reduced capability devices identifies the one or more communications resources as one or more resources elements of the reserved communications resources.

19. An infrastructure equipment according to clause 15, wherein the signalling indication that the reserved communications resources include one or more communications resources which are not allocated for transmitting data to the reduced capability devices does not identify the one or more communications resources as one or more resources elements of the reserved communications resources, the reduced capability device being configured to search for the data within the communications resources of the reserved communications resources allocated by the resource allocation message, for each of one or more possible sets of the one or more communications resources which are not allocated for transmitting data to the reduced capability devices.

20. An infrastructure equipment according to any of clauses 15 to 19, wherein the controller is configured in combination with the transmitter to match transmission parameters of the data being transmitted to the reserved communications resources of the virtual carrier in which the signals representing the data may be transmitted excluding any of the one or more communications resources allocated by the resource allocation message which are not allocated for transmitting data to the reduced capability devices, the reduced capability device being configured to match receiver parameters to the transmission parameters to detect and to recover the data from the communications resources allocated by the resource allocation message.

21. An infrastructure equipment according to any of clauses 15 to 19, wherein the transmission parameters include a rate at which the data is encoded for transmission within the determined communications resources.

22. A infrastructure equipment according to any of clauses 15 to 21, wherein the controller is configured to control the transmitter and the receiver to transmit or to receive the signals for the reduced capability devices of the first type which operate in accordance with a first capability or category and the reduced capability devices of the second type which operate in accordance with a second capability or category.

23. An infrastructure equipment according to any of clauses 14 to 22, wherein the first capability or category is introduced in a first version of a specification and the second capability or category is introduced in a second version of a specification.

24. An infrastructure equipment according to any of clauses 15 to 23, wherein the first version of the specification relating to the reduced capability devices of the first type and the second version of the specification relating to the reduced capability devices of the second type are different releases of a specification pertaining to an Evolved Universal Terrestrial Radio Access Network.

25. An infrastructure equipment according to any of clauses 15 to 24, wherein the reserved communications resources of the host frequency range are within a reserved frequency range within the host frequency range.

26. An infrastructure equipment according to any of clauses 15 to 25, wherein the reserved communications resources comprise one or more resource blocks, each of the resource blocks comprising one or more resource elements, and the one or more communications resources which are not allocated for transmitting data to the reduced capability devices comprise one or more resource elements.

27. An infrastructure equipment according to clause 26, wherein the wireless access interface is formed from Orthogonal Frequency Division Multiplexed, OFDM, symbols generated in the frequency domain from a plurality of sub-carriers, and a resource element comprises a sub-carrier of an OFDM symbol.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1113801.3
[11] UK patent application GB 1121767.6
[12] TS 36.211 section 6.10.3
[13] TS 36.211 section 6.10.5
[14] TS 36.211 section 6.10.5.2
[15] TS 36.212 section 5.1.4

The invention claimed is:

1. A communications device for receiving data from a mobile communications network, the mobile communications network including infrastructure equipment providing a wireless access interface for the communications device, the communications device comprising:

a transmitter configured to transmit signals to the mobile communications network via the wireless access interface, a receiver configured to receive signals from the mobile communications network via the wireless access interface, and a controller for controlling the transmitter and the receiver to transmit and to receive the signals in accordance with the wireless access interface, the wireless access interface providing a plurality of communications resources within a system bandwidth providing a host frequency range of a host carrier, reserved communications resources for preferable allocation to reduced capability devices, the reserved communications resources forming a virtual carrier, and in each of a plurality of time divided units, a shared channel of the communications resources and a control channel formed within the communications resources of the system bandwidth of the host frequency range for communicating resource allocation messages to communications devices, the resource allocation messages for allocating the communications resources of the shared channel to the communication devices within the system bandwidth and for allocating communications resources of the reserved communications resources to the reduced capability devices, wherein the reserved communications resources include one or more communications resources which are not allocated for transmitting data to the reduced capability devices, and the controller is configured with the receiver to receive a resource allocation message from the control channel of the communications resources of the system bandwidth, allocating resources within the reserved communications resources of the virtual carrier for receiving data, determine the communications resources of the reserved communications resources which will contain signals representing the data from the communications resources allocated within the reserved communications resources by the received resource allocation message and excluding any of the one or more communications resources allocated by the resource allocation message which are not allocated for transmitting data to the reduced capability devices within the allocated communications resources, and receive the data from the determined communications resources of the reserved communications resources of the virtual carrier, wherein the communications device is a reduced capability device of a first type, which can receive the resource allocation messages from within the control channel, being a first control channel, within the entire system bandwidth of the host frequency range, and the one or more communications resources which are not allocated for transmitting data to the reduced capability terminal of the first type are used to provide a second control channel within the reserved bandwidth of the virtual carrier for transmitting resource allocation messages to reduced capability devices of a second type which can only receive signals from within the reserved frequency range of the virtual carrier.

2. The communications device as claimed in claim 1, wherein the infrastructure equipment is configured to transmit to the reduced capability devices a signalling indication that a part of the communications resources of the shared channel allocated by the resource allocation message within one or more of the time-divided units of the reserved communications resources include one or more communications resources which are not allocated for transmitting data to the reduced capability devices, and the controller is configured with the receiver to receive from the infrastructure equipment of the mobile communications network the signalling indication that the reserved communications resources of the virtual carrier include one or more communications resources allocated by the resource allocation message which are not allocated for transmitting data to the reduced capability devices, and detect the data from the signals received from the communications resources which have been determined to convey the signals representing the data from the allocated communications resources and excluding any of the one or more communications resources which are not allocated for transmitting data to the reduced capability devices.

3. The communications device as claimed in claim 2, wherein the signalling indication that the reserved communications resources include one or more communications resources which are not allocated for transmitting data to the reduced capability devices, identifies the one or more communications resources as one or more resources elements of the reserved communications resources, which provide the second control channel, and the controller is configured with the receiver to receive the data from signals representing the data which are transmitted in communications resources allocated by the resource allocation message to the communications device which do not include the one or more communications resources which do not include the data.

4. The communications device as claimed in claim 2, wherein the signalling indication that the reserved communications resources include one or more communications resources which are not allocated for transmitting data to the reduced capability devices does not identify the one or more communications resources as one or more resource elements of the reserved communications resources, and the controller and the receiver are configured to determine the communications resources of the reserved communications resources which will contain signals representing the data by searching for the data within the communications resources of the reserved communications resources allocated by the resource allocation message, for each of one or more possible sets of the one or more communications resources which are not allocated for transmitting data to the reduced capability devices.

5. The communications device as claimed in claim 1, wherein the controller and the receiver are configured to determine the communications resources of the reserved communications resources which will contain signals representing the data by searching for the data within the communications resources allocated by the resource allocation message, for each of one or more sets of the one or more communications resources which are not allocated for transmitting data to the reduced capability devices.

6. The communications device as claimed in claim 1, wherein the infrastructure equipment is configured to match transmission parameters of the data being transmitted to the reserved communications resources of the virtual carrier in which the signals representing the data may be transmitted, and the controller is configured in combination with the receiver to match receiver parameters to the transmission parameters to detect and to recover the data from the communications resources allocated by the resource allocation message excluding any of the one or more communications resources which are not allocated for transmitting data to the reduced capability devices.

7. The communications device as claimed in claim 1, wherein the reduced capability device of the first type is configured to operate in accordance with a first capability or category and the reduced capability device of the second type is configured to operate in accordance with a second capability or category.

8. The communications device as claimed in claim 7, wherein the first capability or category is introduced in a first version of a specification relating to an operation of the communications device, the mobile communications network, the infrastructure equipment or the wireless access interface and the second capability or category is introduced in a second version of a specification relating to the operation of the communications device, the mobile communications network, the infrastructure equipment or the wireless access interface.

9. The communications device as claimed in claim 8, wherein the first version of the specification relating to the communications device, the mobile communications network, the infrastructure equipment or the wireless access interface and the second version of the specification relating to the communications device, the mobile communications network, the infrastructure equipment or the wireless access interface are different releases of a specification pertaining to an Evolved Universal Terrestrial Radio Access Network.

10. The communications device as claimed in claim 1, wherein the reserved communications resources of the host frequency range are within a reserved frequency range within the host frequency range.

11. The communications device as claimed in claim 1, wherein the reserved communications resources comprise one or more resource blocks, each of the resource blocks comprising one or more resource elements, and the one or more communications resources which are not allocated for transmitting data to the reduced capability devices comprise one or more resource elements.

12. The communications device as claimed in claim 11, wherein the wireless access interface is formed from Orthogonal Frequency Division Multiplexed, OFDM, symbols generated in the frequency domain from a plurality of sub-carriers, and a resource element comprises a sub-carrier of an OFDM symbol.

13. A method of receiving data from a mobile communications network at a communications device, the mobile communications network including infrastructure equipment providing a wireless access interface for the communications device, the method comprising:

controlling a transmitter to transmit signals to the mobile communications network via the wireless access interface, controlling a receiver to receive signals representing the data from the mobile communications network via the wireless access interface, the wireless access interface providing a plurality of communications resource elements within a system bandwidth providing a host frequency range of a host carrier, reserved communications resources for preferable allocation to reduced capability devices, the reserved communications resources forming a virtual carrier, and in each of a plurality of time divided units, a shared channel of the communications resources and a control channel formed within the communications resources of the system bandwidth of the host frequency range for communicating resource allocation messages to communications devices, the resource allocation messages for allocating the communications resources of the shared channel to the communication devices within the system bandwidth and for allocating communications resources of the reserved communications resources to the reduced capability devices, wherein the reserved communications resources include one or more communications resources which are not allocated for transmitting data to the reduced capability devices, and the controlling the receiver includes receiving a resource allocation message from the control channel of the communications resources of the system bandwidth, allocating resources within the reserved communications resources of the virtual carrier for receiving data, determining the communications resources of the reserved communications resources which will contain signals representing the data from the communications resources allocated within the reserved communications resources by the received resource allocation message and excluding any of the one or more communications resources allocated by the resource allocation message which are not allocated for transmitting data to the reduced capability devices within the allocated communications resources, and receiving the data from the determined communications resources of the reserved communications resources of the virtual, wherein the communications device is a reduced capability device of a first type, which can receive the resource allocation messages from within the control channel, being a first control channel, within the entire system bandwidth of the host frequency range, and the one or more communications resources which are not allocated for transmitting data to the reduced capability terminal of the first type are used to provide a second control channel within the reserved bandwidth of the virtual carrier for transmitting resource allocation messages to reduced capability devices of a second type which can only receive signals from within the reserved frequency range of the virtual carrier.

14. An infrastructure equipment for forming part of a mobile communications network for transmitting data to or receiving data from communications devices, the infrastructure equipment comprising:

a transmitter configured to transmit signals representing the data to the communications devices via a wireless access interface, a receiver configured to receive signals from the communications devices via the wireless access interface, and a controller for controlling the transmitter and the receiver to transmit or to receive the signals in accordance with the wireless access interface, the wireless access interface providing a plurality of communications resources within a system bandwidth providing a host frequency range of a host carrier, reserved communications resources for preferable allocation to reduced capability devices, the reserved communications resources forming a virtual carrier, and in each of a plurality of time divided units, a shared channel of the communications resources and a control channel formed within the communications resources of the system bandwidth of the host frequency range for communicating resource allocation messages to communications devices, the resource allocation messages for allocating the communications resources of the shared channel to the communication devices within the system bandwidth and for allocating communications resources of the reserved communications resources to the reduced capability devices, wherein the reserved section of the communications resources include one or more communications resources which are not allocated for transmitting data to the reduced capability devices, and the controller is configured with the transmitter to transmit a resource allocation message via the control channel of the communications resources of the system bandwidth, the resource allocation message allocating resources within the reserved communications resources of the virtual carrier for a reduced capability device of a first type, and determine the communications resources of the reserved communications resources in which signals representing the data can be transmitted, from the communications resources allocated within the reserved communications resources and excluding any of the one or more communications resources allocated by the resource allocation message which are not allocated for transmitting data to the reduced capability devices, and transmit the data in determined communications resources of the reserved communications resources of the virtual carrier, wherein the reduced capability device of the first type is capable of receiving the resource allocation messages from within the control channel, being a first control channel, within the system bandwidth of the host frequency range, and the controller is configured to control the transmitter and the receiver to transmit or to receive the signals in accordance with the wireless access interface to provide a second control channel within the reserved bandwidth of the virtual carrier for transmitting resource allocation messages to reduced capability devices of a second type which can only receive signals from within the reserved frequency range of the virtual carrier, the second control channel being formed from the one or more communications resources which are not allocated for transmitting data to the reduced capability devices.

15. The infrastructure equipment as claimed in claim 14, wherein the controller is configured in combination with the transmitter to transmit to the reduced capability devices a signalling indication that a part of the communications resources of the shared channel allocated by the resource allocation message within one or more of the time-divided units of the reserved communications resources include one or more communications resources which are not allocated for transmitting data to the reduced capability devices, and the reduced capability device of the first type is configured to detect the signalling indication and to detect the data from the signals received from the communications resources which have been determined to convey the signals representing the data from the communications resources allocated by the resource allocation message and excluding any of the one or more communications resources which are not allocated for transmitting data to the reduced capability devices.

16. The infrastructure equipment as claimed in claim 14, wherein the signalling indication that the reserved communications resources include one or more communications resources which are not allocated for transmitting data to the reduced capability devices identifies the one or more communications resources as one or more resources elements of the reserved communications resources.

17. The infrastructure equipment as claimed in claim 14, wherein the signalling indication that the reserved communications resources include one or more communications resources which are not allocated for transmitting data to the reduced capability devices does not identify the one or more communications resources as one or more resources elements of the reserved communications resources, the reduced capability device of the first type being configured to search for the data within the communications resources of the reserved communications resources allocated by the resource allocation message, for each of one or more possible sets of the one or more communications resources which are not allocated for transmitting data to the reduced capability devices.

18. The infrastructure equipment as claimed in claim 14, wherein the controller is configured in combination with the transmitter to match transmission parameters of the data being transmitted to the reserved communications resources of the virtual carrier in which the signals representing the data may be transmitted excluding any of the one or more communications resources allocated by the resource allocation message which are not allocated for transmitting data to the reduced capability devices, the reduced capability device of the first type being configured to match receiver parameters to the transmission parameters to detect and to recover the data from the communications resources allocated by the resource allocation message.

19. The infrastructure equipment as claimed in claim 18, wherein the transmission parameters include a rate at which the data is encoded for transmission within the determined communications resources.

20. The infrastructure equipment as claimed in claim 14, wherein the controller is configured to control the transmitter and the receiver to transmit or to receive the signals for the reduced capability devices of the first type which operate in accordance with a first capability or category and the reduced capability devices of the second type which operate in accordance with a second capability or category.

21. The infrastructure equipment as claimed in claim 14, wherein the reserved communications resources of the host frequency range are within a reserved frequency range within the host frequency range.

22. The infrastructure equipment as claimed in claim 14, wherein the reserved communications resources comprise one or more resource blocks, each of the resource blocks comprising one or more resource elements, and the one or more communications resources which are not allocated for transmitting data to the reduced capability devices comprise one or more resource elements.

* * * * *